United States Patent Office 3,217,006
Patented Nov. 9, 1965

1

3,217,006
PURIFICATION OF D-3-METHOXY-N-METHYL-$\Delta^6$-MORPHINAN
Yoshiro Sawa, Ashiya-shi, Shin Maeda, Amagasaki-shi, and Naoki Tsuji, Semboku-gun, Japan, assignors to Shionogi & Co., Ltd., Osaka, Japan
No Drawing. Application Jan. 29, 1963, Ser. No. 258,945, now Patent No. 3,144,459, dated Aug. 11, 1964, which is a division of application Ser. No. 214,855, Aug. 16, 1962, now Patent No. 3,211,738. Divided and this application Sept. 12, 1963, Ser. No. 312,818
Claims priority, application Japan, Dec. 29, 1959, 34/41,350, 34/41,351, 34/41,352
3 Claims. (Cl. 260—285)

The present application is a division of copending application Serial No. 258,945, now U.S. Patent No. 3,144,459 which is a division of application Serial No. 214,855, which in turn is a continuation-in-part of application Serial No. 76,511, filed December 19, 1960 (now U.S. Patent No. 3,085,091).

The present invention relates to a method for the purification of D-3-methoxy-N-methyl-$\Delta^6$-morphinan and to novel compounds there involved.

The compound which is purified according to the method of the present invention, D-3-methoxy-N-methyl-$\Delta^6$-morphinan, can be prepared through various routes. Some of these may be represented by the following schemes:

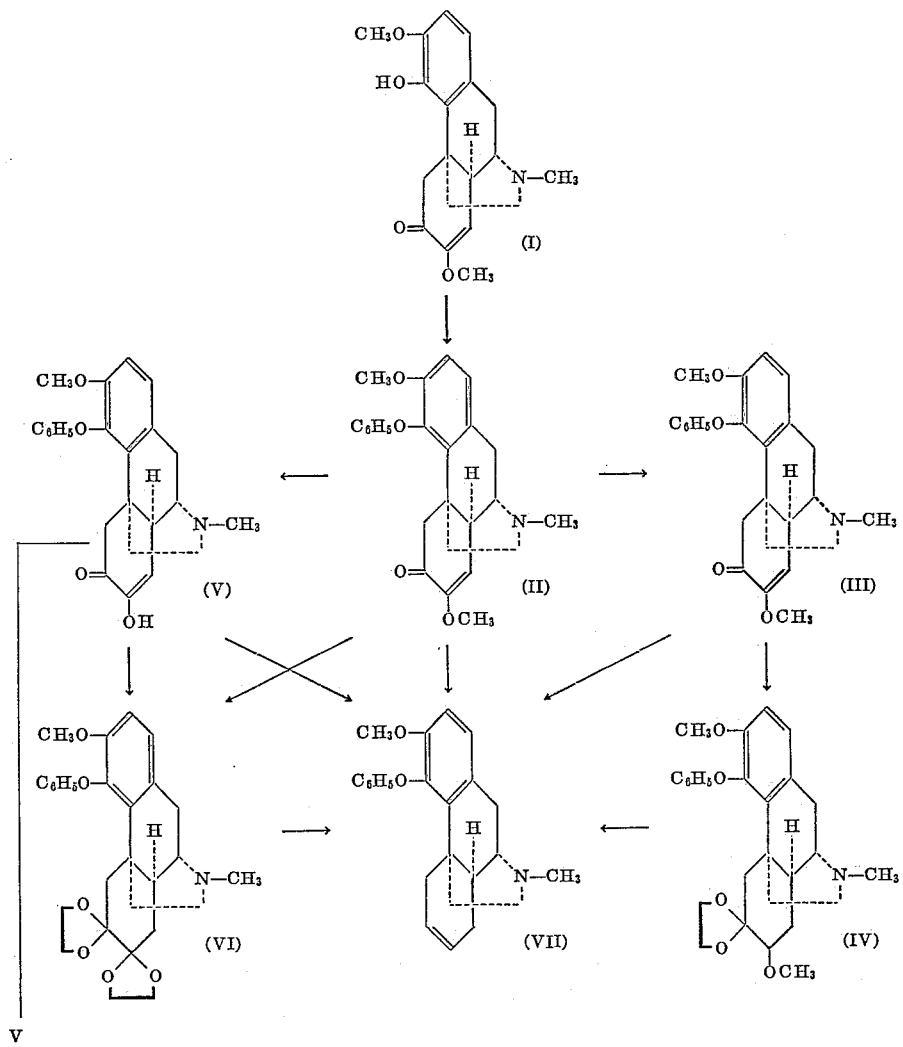

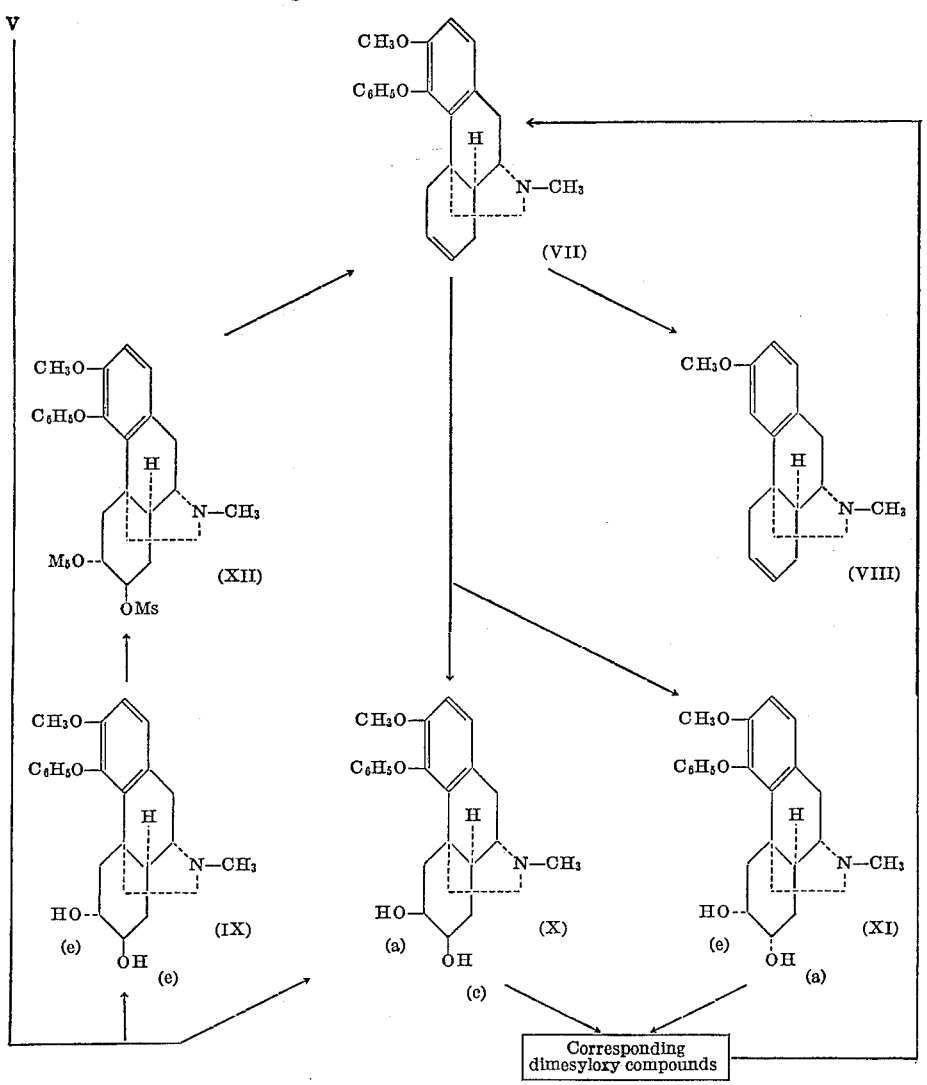

The starting material is sinomenine, one of alkaloids obtained from a plant *Sinomenium acutum*. In this specification the morphinan nucleus of sinomenine is presented as "D"-morphinan and all the compounds are named on this basis.

Firstly, D-3,7-dimethoxy - 4 - hydroxy-6-oxo-N-methyl-$\Delta^7$-morphinan (I), sinomenine, is treated with halogenobenzene in a basic solvent in the presence of copper powder as catalyst to produce D-3,7-dimethoxy-4-phenoxy-6-oxo-N-methyl-$\Delta^7$-morphinan (II). The compound (II) may be treated with amalgamated zinc in concentrated hydrochloric acid to give D-3-methoxy-4-phenoxy-N-methyl-$\Delta^6$-morphinan (VII). Alternatively, the compound (II) may be converted to D-3,7-dimethoxy-4-phenoxy-6-oxo-N-methylmorphinan (III) by catalytic reduction and the latter may be ketalized to D-3,7-dimethoxy-4-phenoxy-6,6 - ethylenedioxy - N - methylmorphinan (IV). On the other hand, the compound (II) may be hydrolyzed to D-3-methoxy-4-phenoxy-6-oxo-7-hydroxy-N-methyl-$\Delta^7$-morphinan (V) which is a tautomer of D-3-methoxy-4-phenoxy-6,7-dioxo - N - methylmorphinan, and the compound (II) as well as the compound (V) may be ketalized to D-3-methoxy-4-phenoxy-6,6;7,7-bisethylenedioxy-N-methyl-morphinan (VI).

Compounds (III), (IV), (V), and (VI) may be also treated with amalgamated zinc in concentrated hydrochloric acid to yield compound (VII).

Compound (VII) is treated with alkali-metal or alkaline-earth-metal in liquid ammonia to yield the objective compound (VIII), D-3-methoxy-N-methyl-$\Delta^6$-morphinan, of which chemical structure has been determined as follows:

(1) The catalytic reduction of compound (VIII) with one molecular equivalent of hydrogen results in D-3-methoxy-N-methylmorphinan, M.P. 109–111° C. which is identical with an authentic sample prepared by a method of O. Schnider et al. (Helv. Chim. Acta, 34, 2211; ibid. 37, 710).

(2) The oxidation of compound (VII) with osmium tetroxide produces corresponding dihydroxy-compounds (X), M.P. 115–126° C. and (XI), M.P. 175–177° C. and the former compound (X) is identical with a compound obtained by reduction of compound (V) with sodium boron hydride.

(3) The compound (VII) can be obtained by demesyloxylation of compound (XII) (the methiodide: M.P. 228° C. (decomp.)) which is prepared by mesylation of the compound (IX), M.P. 126–136° C., one of the reduction products of compound (V) with sodium boron hydride. All the dihydroxy compounds, e.g. (X) and (XI) can be also converted to compound (VII) by the same method.

Although thus produced compound (VIII) can be used as such, it is usually contaminated by a small quantity of by-products having closely similar structures. To obtain an absolutely purified compound (VIII), it is advantageous to carry out a purification at the step of compound (VII). For this purpose, the crude compound (VII) may be converted by bromination to the correspond 6,7-dibromide (XIII) which can be easily purified by recrystallizations as a hydrohalide, and then the 6,7-dibromide (XIII) may be treated with metallic zinc in acetic acid to regenerate the compound (VII), eliminating two bromine atoms. Alternatively, the crude compound (VII) may be converted to the corresponding N-oxide of the 6,7-epoxide by oxidation with per-acid and subsequently hydrogenated by catalytic reduction to give the 6,7-epoxide (XIV), which can be easily purified by recrystallization as a benozate. Then, the epoxide (XIV) may be treated with hydrogen bromide to yield the corresponding bromohydrine (XV) and the latter may be treated with metallic zinc in acetic acid to regenerate the compound (VII).

These purification processes may be illustrated by the following formulae:

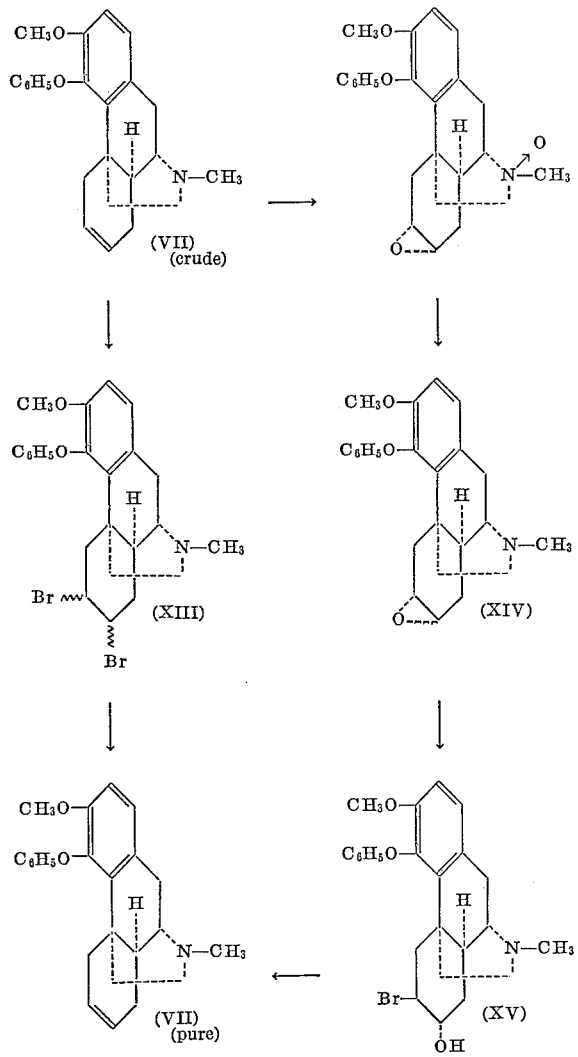

When thus purified compound (VII) is treated with alkali-metal or alkaline-earth-metal in liquid ammonia as described beforehand, the compound (VIII) can be obtained in an absolutely pure state.

The compound (VIII) is usually used as hydrohalide such as hydrochloride, hydrobromide or hydroiodide, but it may be used as quaternary salt with a lower alkyl halide containing up to five carbon atoms (e.g. methyl bromide, ethyl chloride, butyl bromide, etc.) or as a non-toxic acid addition salt such as sulfate, phosphate or the like.

(VIII) is useful as an anticonvulsant for treatment of epilepsy or the like and as a tranquilizer for treatment of mental disorders, especially for suppression of aggressive behavior.

The tranquilizing effect of this compound (VIII) is much distinguished in its property of causing no sleepiness, which is a generally unavoidable incident of a usual tranquilizer.

Practical and presently preferred embodiments of this invention are illustrated by the following examples. The abbreviation "g." refers to grams, and "cc." to milliliters.

*Example 1*

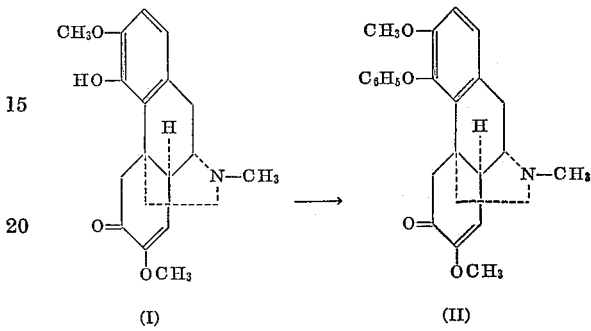

A mixture of D-3,7-dimethoxy-4-hydroxy-6-oxo-N-methyl-$\Delta^7$-morphinan (I) (16.5 g.), bromobenzene (15.7 g.), potassium carbonate (10.3 g.), copper powder (0.5 g.) and pyridine (50 cc.) is refluxed for 15 hours. The hot reaction mixture is filtered and washed with hot pyridine. The solvent is removed by distillation and the residue is dissolved in benzene. The benzene solution is filtered, washed with water, dried on potassium carbonate and chromatographed on alumina to yield 22 g. of crude product. Recrystallization from benzene gives 20.7 g. of the pure benzene adduct of D-3,7-dimethoxy-4-phenoxy-6-oxo-N-methyl-$\Delta^7$-morphinan (II), M.P. 122–124° C. $[\alpha]_D^{19}$ —111.9° (0.940% in ethanol).

*Analysis.*—Calcd. for $C_{25}H_{27}O_4N \cdot C_6H_6$: C. 76.99; H, 6.88; N, 2.90. Found: C, 76.92; H, 7.09; N, 2.76.

The pyridine adduct is separated on cooling the reaction mixture and crystallizing from pyridine, M.P. 120–123° C. $[\alpha]_D^{19}$ —116.4° (0.975% in ethanol

*Analysis.*—Calcd. for $C_{25}H_{27}O_4N \cdot C_5H_5N$: C, 74.35; H, 6.66; N, 5.78. Found: C, 74.51; H, 6.67; N, 5.78.

The free base is crystallized from ether, M.P. 142–143° C. $[\alpha]_D^{18}$ —137.8° (0.994% in ethanol)

*Analysis.*—Calcd. for $C_{25}H_{27}O_4N$: C, 74.05; H, 6.75; N, 3.45. Found: C, 73.94; H, 7.07; N, 3.27.

The picrate is prepared in ether and crystallizes from ethanol, M.P. 230–231° C.

*Analysis.*—Calcd. for $C_{25}H_{27}O_4N \cdot C_6H_3O_7N_3$: C, 58.67; H, 4.77; N, 8.83. Found: C, 58.95; H, 4.93; N, 8.83.

The methiodide is prepared in and crystallizes from ethanol, M.P. 206° C. (decomp.). $[\alpha]_D^{19}$ —121.5° (0.969% in ethanol)

*Analysis.*—Calcd. for $C_{25}H_{27}O_4N \cdot CH_3I \cdot C_2H_5OH$: C, 56.66; H, 6.11; N, 2.36; I, 21.39. Found: C, 56.46; H, 6.04; N, 2.42; I, 21.31.

*Example 2*

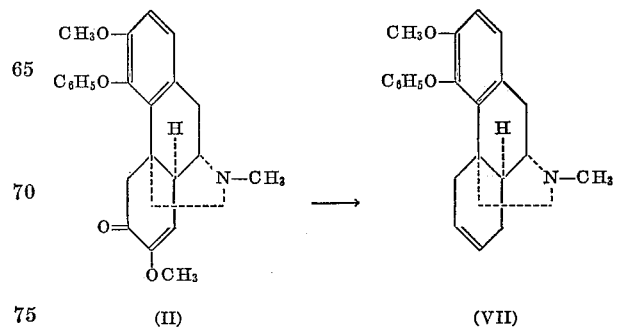

Amalgamated zinc (prepared from 20 g. of mossy zinc and 2 g. of mercuric chloride) is added in small portions to a hot solution of the benzene adduct of D-3,7-dimethoxy-4-phenoxy-6-oxo-N-methyl-$\Delta^7$-morphinan (II) (3.6 g.) in concentrated hydrochloric acid (25 cc.) during 2 hours. The mixture is heated on a water bath with stirring for 6 hours, during which time concentrated hydrochloric acid (15 cc.) is added every 2 hours. The solution is cooled to room temperature, diluted with water, made basic with diluted sodium hydroxide solution and extracted with benzene. The solvent is distilled off under reduced pressure and 2.7 g. of crude product is obtained. An ethanolic solution of the product is refluxed with hydroxylamine hydrochloride (0.5 g.) and sodium acetate (0.5 g.) for one hour. The solvent is distilled off and the residue in water made alkaline with diluted sodium hydroxide solution and extracted with ether. The product is chromatographed on alumina and the ether eluate gives 2.43 g. of D-3-methoxy-4-phenoxy-N-methyl-$\Delta^6$-morphinan (VII) as a sirup. $[\alpha]_D^{23}$ +52.4° (0.722% in ethanol).

The free base does not crystallize, but its methanol adduct is obtained as needles when this sirup is treated with methanol, M.P. 91–96° C. $[\alpha]_D^{22}$ +51.5° (1.028% in ethanol)

Analysis.—Calcd. for $C_{24}H_{27}O_2N \cdot CH_3OH$: C, 76.30; H, 7.94; N, 3.56; $OCH_3$, 15.77. Found: C, 76.47; H, 8.02; N, 3.51; $OCH_3$, 14.55

The methiodide is prepared in and crystallizes from ethanol, M.P. 228° C. $[\alpha]_D^{24}$ +34.4° (1.016% in ethanol).

Analysis. — Calcd. for $C_{24}H_{27}O_2N \cdot CH_3I \cdot C_2H_5OH$: C, 59.01; H, 6.60; N, 2.55; I, 23.10. Found: C, 58.63; H, 6.67; N, 2.82; I, 23.43.

The picrate is prepared in and crystallizes from ethanol, M.P. 211–212° C.

Analysis.—Calcd. for $C_{24}H_{27}O_2N \cdot C_6H_3O_7N_3$: C, 61.01; H, 5.12; N, 9.49. Found: C, 60.88; H, 5.44; N, 9.29.

*Example 3*

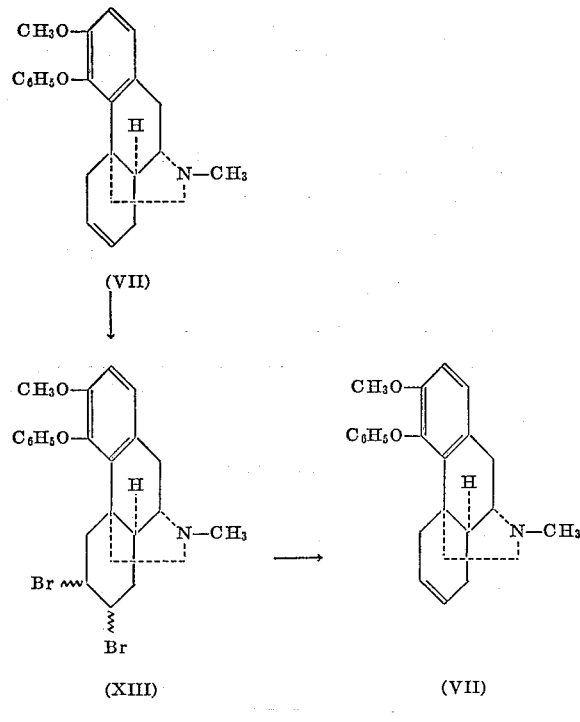

(Purification of the compound (VII))

Crude methanol adduct of D-3-methoxy-4-phenoxy-N-methyl-$\Delta^6$-morphinan (VII) (10 g.) is dissolved in benzene (50 cc.) and then the benzene is distilled off. The same treatment is repeated to remove the methanol. To a solution of thus obtained free base in benzene (100 cc.) is added a benzene solution (58 cc.) of bromine (benzene: bromine=10:1) with stirring at 10° C. and allowed to stand over night. Precipitated crystals are collected by filtration and washed with benzene to give 4.085 g. of hydrobromide of D-3-methoxy-4-phenoxy-6,7-dibromo-N-methylmorphinan (XIII). M.P. 221–222° C. (decomp.) (recrystallized from 99% ethanol).

The mother liquor is washed twice with 10% sodium hydroxide solution, concentrated to a half volume, shaken with 5% hydrochloric acid and allowed to stand to give 3.641 g. of crystals, M.P. 197–198° C. (hydrochloride of (XIII)). Two layers of the mother liquor are separated. The benzene layer is shaken with 100 cc. of water and allowed to stand over night to yield 0.633 g. of crystals, M.P. 203–205° C. (hydrochloride of (XIII)).

Thus obtained salts of D-3-methoxy-4-phenoxy-6,7-dibromo-N-methylmorphinan (XIII) are treated with 10% sodium carbonate solution to obtain the free base (XIII), M.P. 170–171° C.

Analysis.—Calcd. for $C_{24}H_{27}O_2NBr$: C, 55.29; H, 5.22; N, 2.69; Br, 30.66. Found: C, 55.56; H, 5.24; N, 2.83; Br, 30.55.

A solution of the free base (XIII) (6.35 g.) in glacial acetic acid (50 cc.) is heated with zinc dust (8.4 g.) for 3 hours on a boiling water bath with stirring. Upon cooling, the reaction mixture is made alkaline with aqueous ammonia and extracted with ether. After removal of ether, the residue is crystallized from methanol and yields 4.45 g. of pure methanol adduct of D-3-methoxy-4-phenoxy-N-methyl-$\Delta^6$-morphinan (VII). M.P. 98–100° C.

Any impurity is not detected in thus purified product even by a gas-chromatographic analysis. $[\alpha]_D^{25.5}$ +88.6° (0.988% in ethanol).

The methiodide: M.P. 223–224° C. (recrystallized from acetone). $[\alpha]_D^{26}$ +54.0° (0.764% in methanol).

Analysis.—Calcd. for $C_{24}H_{27}O_2N \cdot CH_3I \cdot CH_3COCH_3$: C, 59.89; H, 6.46; N, 2.49; I, 22.60. Found: C, 60.03; H, 6.49; N, 2.94; I, 22.78.

*Example 4*

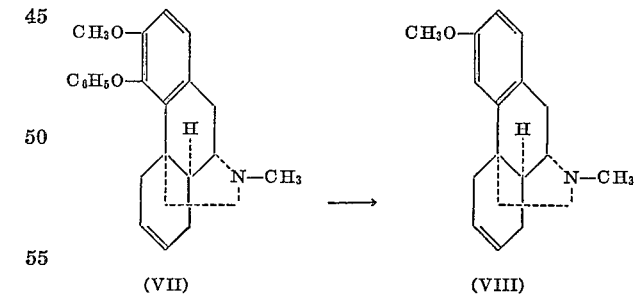

A solution of D-3-methoxy-4-phenoxy-N-methyl-$\Delta^6$-morphinan (VII) (7.47 g.), purified by a method described in Example 12 or 13, in dry toluene (70 cc.) is added dropwise to liquid ammonia (300 cc.) (treated previously with a small amount of metallic sodium at −55 to −60° C.). Another 1.3 g. of metallic sodium is added to this stirred solution keeping the temperature at about −55 to −60° C. When a blue coloration has persisted for one hour, a small amount of ammonium chloride is added and the blue color disappears. Liquid ammonia is evaporated and the residue is treated with ether and the ether extracts are washed with diluted sodium hydroxide solution. The ether layer gives 5.4 g. of D-3-methoxy-N-methyl-$\Delta^6$-morphinan, M.P. 81–82° C. The product is dissolved in ether and chromatographed on alumina to give 5.1 g. of pure D-3-methoxy-N-methyl-$\Delta^6$-morphinan, M.P. 81–82° C. $[\alpha]_D^{27}$ +138.5° (1.103% in ethanol).

The picrate is prepared in and crystallizes from methanol, M.P. 178–179° C.

*Analysis.*—Calcd. for $C_{18}H_{23}ON \cdot C_6H_3O_7N_3$: C, 57.82; H, 5.26; N, 11.24. Found: C, 57.91; H, 5.37; N, 11.04.

The hydrobromide is crystallized from hot water, M.P. 111–113° C. (decomp.). $[\alpha]_D^{30}$ +82.6° (1.062% in water).

Having thus disclosed the invention, what is claimed is:

1. D-3-methoxy-4-phenoxy - 6,7-dibromo - N - methylmorphinan.
2. Hydrohalide of D-3-methoxy - 4 - phenoxy - 6,7-dibromo-N-methylmorphinan.
3. A method for the purification of D-3-methoxy-4-phenoxy-N-methyl-$\Delta^6$-morphinan which comprises reacting the compound with bromine at about 10° C. to obtain D-3-methoxy-4-phenoxy-6,7 - dibromo - N - methylmorphinan, crystallizing the latter as hydrohalide and treating the 6,7-dibromide with metallic zinc in acetic acid at about 100° C. to regenerate D-3-methoxy-4-phenoxy-N-methyl-$\Delta^6$-morphinan.

No references cited.

NICHOLAS S. RIZZO, *Primary Examiner.*